United States Patent
Jheeta et al.

(10) Patent No.: US 10,296,648 B2
(45) Date of Patent: May 21, 2019

(54) SYSTEMS AND METHODS FOR DOMAIN INVENTORY INDEX GENERATION FROM DISPARATE SETS

(71) Applicant: GO DADDY OPERATING COMPANY, LLC, Scottsdale, AZ (US)

(72) Inventors: Moninder Jheeta, Fremont, CA (US); Wei-Cheng Lai, Cupertino, CA (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 556 days.

(21) Appl. No.: 14/985,937

(22) Filed: Dec. 31, 2015

(65) Prior Publication Data
US 2016/0171115 A1    Jun. 16, 2016

Related U.S. Application Data

(63) Continuation-in-part of application No. 14/788,594, filed on Jun. 30, 2015, and a continuation-in-part of application No. 14/788,592, filed on Jun. 30, 2015, and a continuation-in-part of application No. 14/568,447, filed on Dec. 12, 2014.

(51) Int. Cl.
*G06F 17/30* (2006.01)
*H04L 29/12* (2006.01)
*G06Q 10/00* (2012.01)

(52) U.S. Cl.
CPC .... *G06F 17/30867* (2013.01); *G06F 17/3053* (2013.01); *G06F 17/30528* (2013.01); *G06F 17/30887* (2013.01); *G06Q 10/00* (2013.01); *H04L 61/3025* (2013.01); *H04L 61/302* (2013.01)

(58) Field of Classification Search
CPC .................... G06F 17/30864; G06F 17/30867
See application file for complete search history.

(56) References Cited

U.S. PATENT DOCUMENTS

| | | | |
|---|---|---|---|
| 9,691,068 B1 * | 6/2017 | Azari | G06F 17/30861 |
| 2013/0311583 A1 * | 11/2013 | Humphreys | H04L 51/14 709/206 |
| 2016/0065534 A1 * | 3/2016 | Liu | H04L 63/1441 707/728 |
| 2016/0065535 A1 * | 3/2016 | O'Leary | H04L 63/1441 707/728 |

* cited by examiner

*Primary Examiner* — Mohammad S Rostami
(74) *Attorney, Agent, or Firm* — Quarles & Brady LLP

(57) ABSTRACT

Systems and methods for ranking domain names across disparate sets thereof include receiving domain name search results from multiple sources, wherein a ranking function is unusable to rank sets from the disparate sources against each other, normalizing the sets to generate a plurality of normalized candidate domain names that can be ranked against each other using the ranking function, and applying the ranking function to the plurality of normalized candidate domain names to create a ranked list of domain names. The ranked list may be sent to the device of the searching entity so that the "best" domain name can be selected even when the results originate from disparate results.

15 Claims, 10 Drawing Sheets

SYSTEMS AND METHODS FOR DOMAIN INVENTORY INDEX GENERATION FROM DISPARATE SETS

CROSS-REFERENCE TO RELATED APPLICATIONS

This patent application is a continuation-in-part and claims the benefit of U.S. patent application Ser. No. 14/788,594, entitled "SYSTEMS AND METHODS FOR DOMAIN NAME INVENTORY GENERATION," and Ser. No. 14/788,592, entitled "SYSTEMS AND METHODS FOR DOMAIN NAME INVENTORY GENERATION," both filed Jun. 30, 2015, and this application is also a continuation-in-part claiming the benefit of U.S. patent application Ser. No. 14/568,447, entitled "DOMAIN NAME GENERATION AND RANKING," filed Dec. 12, 2014, each of which applications are incorporated fully herein by reference.

FIELD OF THE INVENTION

The present invention generally relates to domain name generation and registration, and, more specifically, to systems and methods for assisting a user to obtain domain names that are potentially valuable and relevant to the user.

BACKGROUND OF THE INVENTION

For Internet users and businesses alike, the Internet continues to be increasingly valuable. Individuals and businesses depend on their online presences, particularly their websites, to deliver current and useful information to customers, readers, and other Internet users. Websites are made available to visitors online via domain names that the visitors type into Internet browsing software. A domain name is comprised of at least two labels each separated by a period and including a top-level domain (TLD) as the rightmost label, with a second-level domain (SLD) to the left of the TLD and further subordinate levels, called subdomains, extending to the left. Thus, an example domain name is "blog.example.com," where "com" is the TLD, "example" is the SLD, and "blog" is a subdomain.

A domain name is unique: there can be only one instance of a particular combination of SLD and TLD registered for use on the internet. An SLD can be a string of up to 63 characters containing any combination of letters, numbers, and dashes. The SLD is typically a word or combination of words with or without dashes separating the words. The composition of a TLD, on the other hand, is restricted; there are a finite number of TLDs, which number is currently growing. TLDs are divided into country-code TLDs (ccTLDs), which are two-letter TLDs designating a specific country, and generic TLDs (gTLDs), which contain three or more letters. The foundational gTLDs .com, .net, and .org were the only gTLDs available to businesses and individuals until about the year 2000, and are still the most commonly used gTLDs. Since 2000, and particularly since 2012, many more gTLDs have become available and include abbreviations (.biz, .info) as well as words up to eight letters in length (.shop, .arts, .clothing). However, .com and other older gTLDs remain the most sought-after due to familiarity, solid registry infrastructure, and other reasons.

The exhaustibility of domain names has given rise to a domain name aftermarket where registered domain names, or those with expired registrations, are bought and sold, often for high sums. As an illustration, WIKIPEDIA maintains a list of the most expensive domain names (of published sale prices). The top entry on the list is currently Insurance.com, sold for $35.6 million in 2010; the 26th entry on the list is currently Whisky.com, sold for $3.1 million in 2013. The domain name aftermarket includes domain name auctions as well as set pricing. Additionally, some registrars maintain "premium" pricing for certain available domain names, based on metrics such as age and use (i.e., traffic) of the domain name and popularity of terms within the domain name. Premium prices can range from hundreds to thousands of dollars per year. Yet, businesses and individuals will pay the premium price in order to serve their web presences from those valuable properties.

Domain name service providers, such as registrars and website hosting providers, facilitate a user's identification and registration of a domain name via a domain search system. The system includes a user interface in which the user enters her desired domain name or search terms, and a back-end server or network of servers that processes the user input to determine if the domain name is available. The domain search system can further generate suggestions, referred to herein as "candidate domain names," that are similar to the input domain name or search terms. This gives the user flexibility in case the exact desired domain name is unavailable or too expensive, or in case the user does not know exactly which terms she wants included in the SLD, or which TLD to choose. The user may also want to register multiple similar domain names to capture additional traffic or prevent others from using too similar a domain name. The process of generating candidate domain names is known in the art as "spinning." Typically, spinning begins with identifying known words, or "tokens," within the domain search input. Then, variations on the word combinations are generated using one or several techniques, including without limitation rearranging tokens, pluralizing tokens, concatenating characters, truncating or abbreviating words, and finding semantically similar words such as synonyms and spelling variants. Several algorithms exist for ranking the resulting candidate domain names according to one or more metrics that indicate relevance to the domain search terms or to the user.

The selected domain name is likely to become valuable to the registrant as she develops her web presence or simply holds the registration with the intent to resell it. The speed of the domain search and the quality of candidate domain names factor significantly into the user's ability to secure the most valuable domain name(s). One problem that impacts the speed of a domain search is the complexity involved in spinning candidate domain names. It would be advantageous to minimize the amount of time the system needs to identify candidate domain names and confirm they are available for registration.

One problem that impacts the quality of candidate domain names is the fact that the candidates may be records in disparate domain data sources. For example, the system may spin 100 candidate domain names from the search terms, and may also identify another 100 candidates in the domain aftermarket index. A solution is needed that allows the system to rank the candidate domain names from these disparate sources in a single list. Current domain spinning algorithms employ rule-based "blending" of disparately sourced results. A system blends the disparate sets of search results by applying rules that are essentially quotas. For example, a system that has access to an aftermarket index and a ccTLD index and also spins a set of candidate domain names in real time may form a set of top ten candidate domain names by selecting the four highest ranking spun domain names, the three highest ranking candidate domain names from the aftermarket index, and the three highest ranking candidate domain names from the ccTLD index. This solution is not truly ranking the candidate domain names across sets, and may result in exclusion of more valuable or relevant candidate domain names in order to meet the rules.

DETAILED DESCRIPTION OF THE PREFERRED EMBODIMENT

Figure 1:
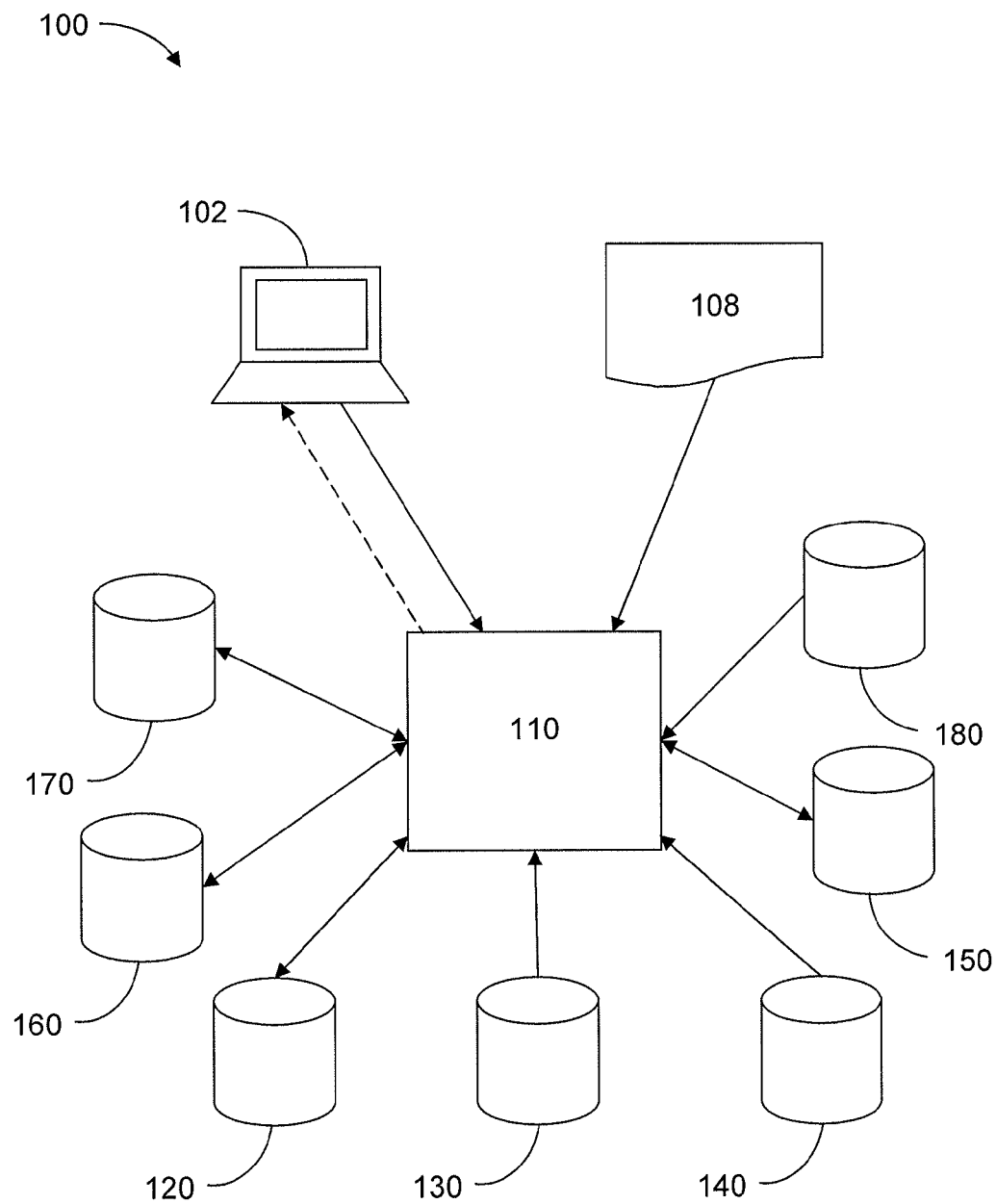
FIG. 1 is a schematic diagram of a system and associated operating environment in accordance with the present disclosure.

The present invention achieves the aforementioned goals by providing a system and method for creating and continuously expanding an indexed inventory of domain names that are interconnected based on token similarities. The domain names may be indexed with metadata describing each domain name's connections to the other domain names. The present invention overcomes the drawbacks of existing domain search systems by enabling a domain search system to search the indexed inventory of domain names for candidate domain names instead of spinning all of the candidate domain names itself, improving the search and recommendation speed.

The present invention also achieves the aforementioned goals by providing a system and method for ranking candidate domain names across disparate sets thereof in real time. The domain names may be ranked by normalized token frequency as well as other metadata describing each candidate domain name, such as demand, price, interconnections in an indexed inventory, language model, and the like. The present invention overcomes the drawbacks of existing domain search systems by ranking all of the available candidate domain names together in real time rather than offline.

In one embodiment, the present disclosure describes a method performed by a server or other computing device and including the steps of: receiving, from a computing device in electronic communication with the server, as input in a domain name search query, one or more search tokens that form a second level domain of a target domain name; receiving a first plurality of candidate domain names each identified as relevant to one or more of the one or more search tokens; receiving a second plurality of candidate domain names each identified as relevant to one or more of the one or more search tokens, the second plurality of candidate domain names being disparate from the first plurality of candidate domain names, wherein a ranking function is unusable to rank one or both of the first plurality of domain names and the second plurality of domain names; normalizing the first plurality of candidate domain names and the second plurality of candidate domain names to generate a plurality of normalized candidate domain names that can be ranked against each other using the ranking function; applying the ranking function to the plurality of normalized candidate domain names to create a ranked list of domain names; and sending the ranked list of domain names to the computing device.

Receiving the one or more search tokens may include identifying the one or more search tokens from a character string comprising the second level domain. Receiving a first candidate domain name of the first plurality of candidate domain names may include the steps of: for each of the search tokens, comparing the search token to each of a plurality of previously registered domain names in one or more indexes; and responsive to an indication that one of the previously registered domain names contains one of the search tokens, storing the one of the previously registered domain names as the first candidate domain name. Receiving the first plurality of candidate domain names may include generating the first plurality of candidate domain names in real-time in response to the domain name search query. Receiving the second plurality of candidate domain names may include obtaining the second plurality of candidate domain names from an index of pre-existing domain names.

In an embodiment where each candidate domain name of the first plurality of candidate domain names and the second plurality of candidate domain names includes one or more tokens of a plurality of tokens, each token of the plurality of tokens appears in at least one of the candidate domain names, and all of the candidate domain names are formed from one or more of the plurality of tokens, normalizing the first plurality of candidate domain names and the second plurality of candidate domain names may include the steps of: generating a token index of the plurality of tokens; calculating the term frequency-inverse document frequency (TF-IDF) of each token in the token index using each of the candidate domain names as a document; and, for each candidate domain name, using the TF-IDF of each of the tokens in the candidate domain name to calculate a normalized score for the candidate domain name. Normalizing the first plurality of candidate domain names and the second plurality of candidate domain names may further include determining a domain demand for each of the candidate domain names, and modifying the normalized score of each of the candidate domain names with the domain demand for the candidate domain name.

In one embodiment, the present disclosure describes a method performed by a server or other computing device and including the steps of: receiving a plurality of domain name sets generated by a plurality of disparate domain name sources, each domain name set containing a corresponding plurality of domain names; identifying one or more tokens in a second level domain of each of the domain names; computing, using the one or more tokens, a normalized score for each of the domain names; and generating, from the normalized score for each of the domain names, a ranked list of the plurality of domain names in order of relevance to at least a first token of the one or more tokens. In embodiments where a ranking function is unusable to rank one or both of a first domain name set and a second domain name set both selected from the plurality of domain name sets, generating the ranked list may include applying the ranking function to the first domain name set and the second domain name set using the normalized scores.

The method may further include the steps of: receiving, from a computing device in electronic communication with the server, a domain name search query having one or more search terms that form a second level domain of a target domain name, each domain name in each of the plurality of domain name sets including one or more of the one or more search terms; and sending the ranked list of domain names to the computing device. Receiving the plurality of domain name sets may include the steps of: sending the one or more search terms to a first domain name source of the plurality of disparate domain name sources, the first domain name source generating a plurality of candidate domain names from the one or more search terms in real-time; and receiving a first domain name set of the plurality of domain name sets from the first domain name source, the corresponding plurality of domain names in the first domain name set comprising the plurality of candidate domain names.

Receiving the plurality of domain name sets may include obtaining a first domain name set of the plurality of domain name sets from a first domain name source of the plurality of disparate domain name sources, the first domain name source storing an index of pre-existing domain names. Computing the normalized score of each domain name may include the steps of: calculating the TF-IDF of each token of the one or more tokens using each of the domain names in the plurality of domain name sets as a document; and using the TF-IDF of each of the tokens in the domain name to calculate the normalized score for the domain name.

In one embodiment, the present disclosure describes a system including a server or other computing device and a disparate set ranking module installed on the server. The server may be communicatively coupled to a network and configured to receive a first plurality of domain names and a second plurality of domain names disparate from the first plurality of candidate domain names, wherein a ranking function is unusable to rank together the first plurality of domain names and the second plurality of domain names. One or more processors of the server may executing the disparate set ranking module to: normalize the first plurality of domain names with the second plurality of domain names to generate a set of normalized domain names that can be ranked using the ranking function; and apply the ranking function to the set to generate a ranked list of domain names. To normalize the first plurality of domain names with the second plurality of domain names, the one or more processors may execute the disparate set ranking module to identify one or more tokens in a second level domain of a first domain name of the first plurality of domain names, and compute, using the one or more tokens, a normalized score for the first domain name. The one or more processors may apply the ranking function using the normalized score. The one or more processors may execute the disparate set ranking module to calculate the TF-IDF of each token of the one or more tokens using each of the domain names in a plurality of domain name sets as a document, the plurality of domain name sets including the first plurality of domain names and the second plurality of domain names, the one or more processors using the TF-IDF of each token of the one or more tokens to compute the normalized score.

The server may be further configured to receive, from a computing device in electronic communication with the server via the network, a domain name search query including one or more search terms that form a second level domain of a target domain name, each domain name of each of the first plurality of domain names and the second plurality of domain names including one or more of the one or more search terms and to send the ranked list of domain names to the computing device. The system may include a domain name suggestion module installed on the server, the one or more processors executing the domain name suggestion module to generate the first plurality of domain names from the one or more search terms in real-time. To receive the first plurality of domain names, the server may be configured to obtain the first plurality of domain names from a first domain name source comprising an index of pre-existing domain names.

FIG. 1 illustrates a system 100 that implements the present invention in a computing environment. In particular, a suitable environment, in which context the present invention is described herein in detail, is a data and/or hosting server system of a domain name registrar or domain name search engine. However, it will be understood that other environments are suitable for implementing the system 100 and methods described herein. A server 110 is in electronic communication with a user via the user's device 102, and is also in communication with other users' devices 108, all of which may submit one or more domain searches to the server 110. The server 110 may present a user interface to the user via the user device 102. The user interface may include a domain search submission form, and may further include interfaces for displaying demand and appraisal data and for facilitating purchases of domain names, as described further below. The server 110 is configured to access and perform data storage, manipulation, and/or retrieval on one or more data stores as described below.

Any suitable network topology may be used to facilitate interfaces between the server 110, the user devices 102, 108, and the data stores of the system 110. The server 110 may be configured to communicate electronically with one or more data stores in order to retrieve information from the data stores. The electronic communication may be over the Internet using any suitable electronic communication medium, communication protocol, and computer software including, without limitation: a wired connection, WiFi or other wireless network, cellular network, or satellite network; TCP/IP or another open or encrypted protocol; browser software, application programming interfaces, middleware, or dedicated software programs. The electronic communication may be over another type of network, such as an intranet or virtual private network, or may be via direct wired communication interfaces or any other suitable interface for transmitting data electronically from a data store to the server 110. In some embodiments, a data store may be a component of the server 110, such as by being contained in a memory module or on a disk drive of the server 110.

A data store may be any repository of information that is or can be made freely or securely accessible by the server 110. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML or JSON data object database, file, collection of files, spreadsheet, or other means of data storage located on a computer, client, server, or any other storage device known in the art or developed in the future; file systems; and electronic files such as web pages, spreadsheets, and documents. Each data store accessible by the server 110 may contain information that is relevant to determining demand for and appraising domain names as described below. Each of the data stores may be temporary or permanently implemented.

The server 110 may maintain search logs 120 in the form of a data store accessible by the server 110. In another embodiment, the server 110 may simply access the search logs 120, which are stored and maintained by another server (not pictured). The search logs 120 include a record for each domain search submitted to the server 110. The record may include the domain search terms, the date and time the domain search was submitted, and other information about the domain search that may be used for data analysis, such as the originating IP address, search interface used, and the like.

The system 100 may further include a demand data store 150 in which the server 110 may store calculated demand data for previous domain searches and time intervals as described below. The server 110 may access the demand data store 150 to retrieve stored demand data for performing additional demand calculations, such as averaging demand across time intervals or displaying demand trends in a user interface.

The present disclosure identifies the demand for a domain name as the frequency with which the domain name SLD is entered as a search term in a domain search, normalized against one or more search term corpuses and for one or more time intervals. In order to obtain demand figures that are most relevant to the valuation and acquisition of domain names, the corpus from which the search frequency is calculated may be obtained or built up from, or populated with, data from data sources that are exclusively or substantially relevant to domain names. Non-limiting examples of such data sources include: search logs 120 of a domain registrar or domain search engine, which contain search terms previously submitted by users attempting to secure a domain name corresponding to the search terms; domain name system (DNS) logs from recursive or public DNS servers, which may contain queries from other computer systems for domain names to be resolved; aggregate search databases containing metadata, logs, reports, and/or other lists of domain search keywords; and the like. In contrast, previous solutions obtained search frequencies from the indexes of general search engines, such as GOOGLE, which store large amounts of search data that are not relevant to domain name acquisitions.

A domain search may include multiple search terms, referred to herein as tokens. Tokens include words and n-grams. A word may be identified by comparison to a search term index, one or more search logs 120, a dictionary, or another suitable index using any suitable string matching algorithm (e.g., Aho-Corasick). Additionally, a word may be identified from the context of the domain search. In one embodiment, the domain search may be entered as a series of words (i.e., keywords) each separated from the other by a space. In another embodiment, the domain search may be a single string, and any substrings left unmatched when words are identified via index comparison may also be treated as words. An n-gram is a group of two or more words. Multiple n-grams may be present in any group of three or more words. For example, the word group "adams car sales" includes the n-grams "adams car," "adams sales," and "car sales." Additionally, tokens may be identified by repeated index comparisons to obtain words that have overlapping letters in the domain search string. For example, tokens from the domain search string "adamscarsales" may include: adam, adams, scar, scars, car, sales, ales, adam scar sales, adam scars ales, adams car sales, adamscarsales, and other less likely substrings and n-grams.

The order in which the words in an n-gram are arranged may be considered when calculating search frequency for the n-gram. Preferably, however, the order is ignored. The proximity in the domain search string of the words in the n-gram may also be considered. In the strictest case, the n-gram may only be considered to match a search (causing the search frequency to increment) in the search logs 120 if the words of the n-gram appear adjacent to each other. A more permitting setting for proximity allows the n-gram to match searches where the words are separate by one or more characters or words.

Normalization of the search frequency of a token may include multiple aspects of data normalization. The search frequency may be normalized to reduce or eliminate "noise" in the demand calculation caused by high-frequency terms that have low value. The server 110 may maintain a stop word list containing terms known to have no value to the demand calculation, such as "and," "the," and "of." Tokens appearing on the stop word list may be eliminated from the demand analysis. Numbers and dashes may also be eliminated. Known data normalization techniques may be applied to attenuate the raw values for search frequencies. Non-limiting examples of such techniques include term frequency, inverse document frequency, and the combination term frequency-inverse document frequency (TF-IDF). More specific examples known to be suitable for short string analysis include the Okapi BM25 ranking function and the divergence from randomness framework.

Figure 2:
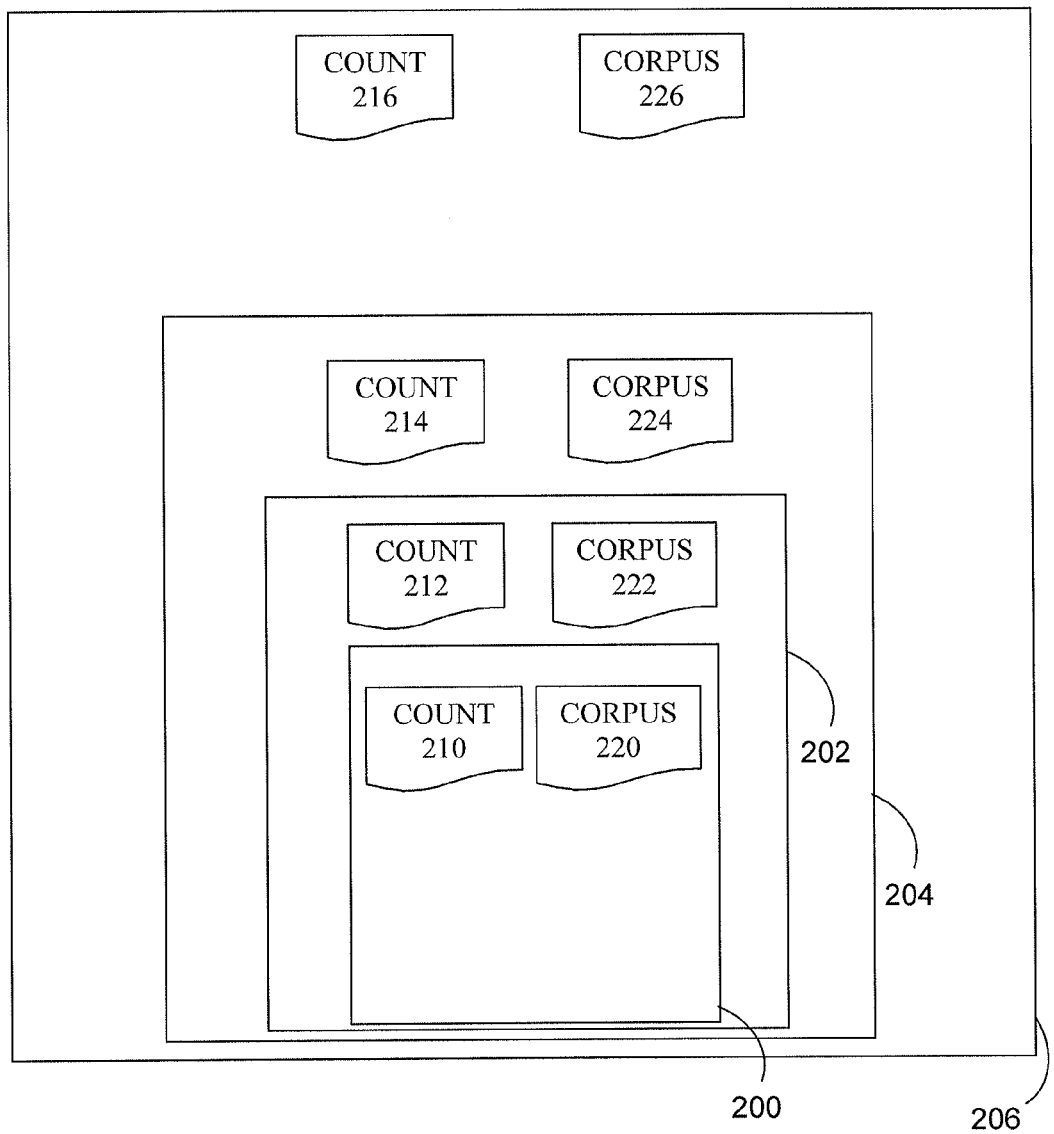
FIG. 2 is a schematic diagram of a series of time intervals and data associated therewith for generating a domain demand.

Referring to FIG. 2, the search frequency of a token may be calculated and normalized across multiple time intervals. The use of search frequency data over multiple time intervals provides a desired level granularity in the demand values, particularly in a registrar or domain search engine environment, where tens of thousands of domain searches may be performed every minute. For example, search frequencies extracted from a time interval of ten minutes are normalized against a much lower volume of total domain searches than are those extracted from a time interval of one day. Time intervals may be repeated, such as a sequence of days, and/or may be linearly, logarithmically, or parametrically scaled, such as ten minutes, one hour, one day, one week, one month, and so on.

FIG. 2 illustrates a progression of time intervals 200, 202, 204, 206 beginning from the shortest time interval 200 and including any suitable number of intervals, including repeated intervals 200, until the longest interval 206 is reached. By maintaining a corpus of search terms for at least as long as the longest interval 206, a search frequency 210, 212, 214, 216 may be calculated for each interval 200-206 at any time, or the search frequency may be calculated at the end of each interval and analyzed immediately or stored for later analysis. Each interval 200-206 may further include its own corpus 220, 222, 224, 226 against which the search frequency 210-216 for that time interval 200-206 may be normalized. Any of the normalization techniques described above may be applied to the search frequency 210-216 of each time interval 200-206. Furthermore, a search frequency for a token may be normalized across multiple time intervals. In one example, the search frequency may be normalized for a number of consecutive days and then averaged across those days. The average may, for example, serve as a baseline comparison for the normalized search frequency of the current day. If the current search frequency is close in value to the average, it may indicate low or stagnant demand, while a much higher current search frequency may indicate a sudden increase in demand. Scaled time intervals, such as those of FIG. 2, may be linearly or otherwise weighted to attenuate search frequencies over longer time intervals. The normalization algorithm may be tuned to accommodate a desired emphasis, such by increasing the weight of shorter time intervals to produce more pronounced values for search frequencies in the recent past.

Figure 3:
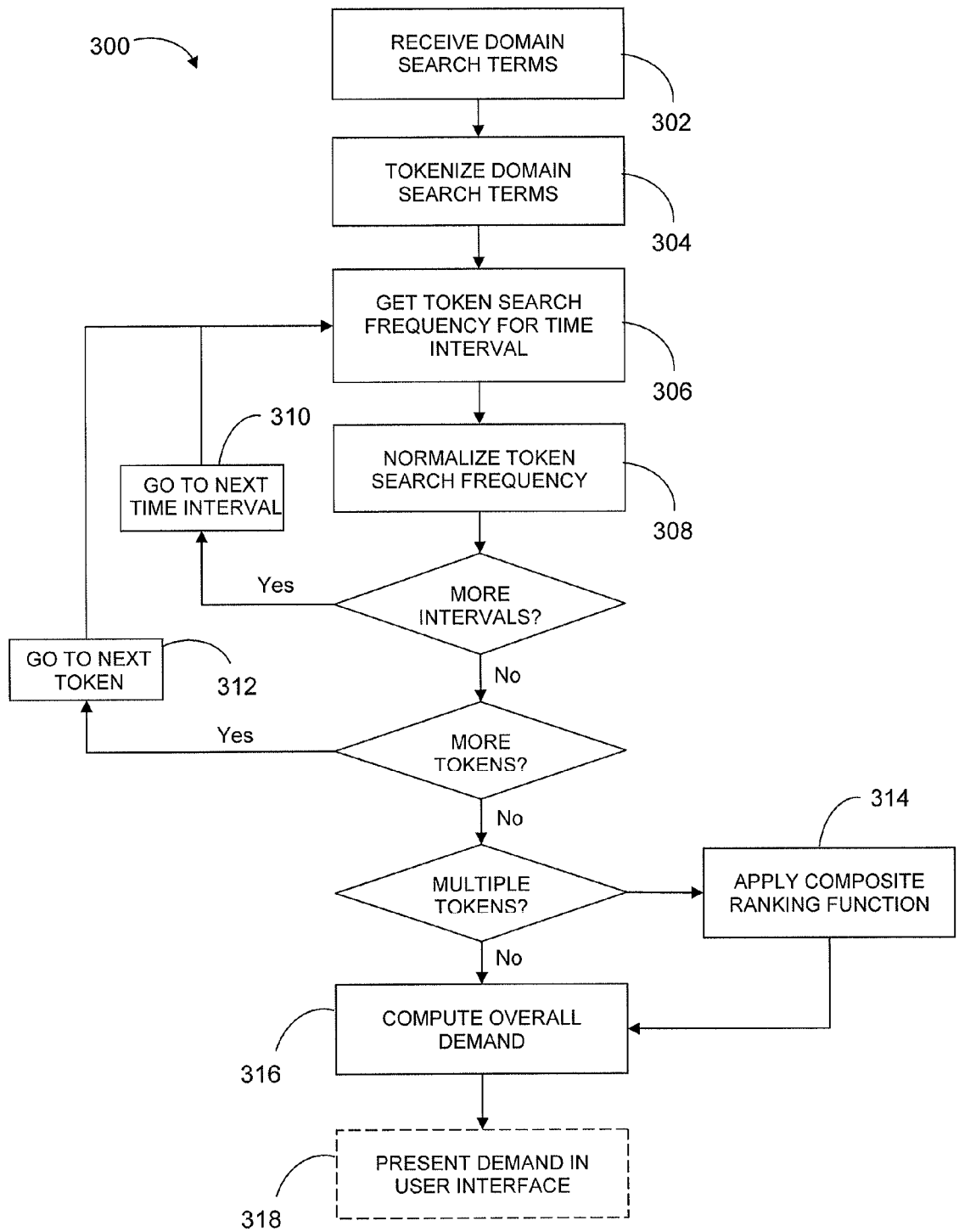
FIG. 3 is a flow diagram of an embodiment of a method for automatically computing an overall domain demand in accordance with the present disclosure.

Referring to FIG. 3, a method 300 of determining the demand for a domain name may be implemented by the server 110. At step 302, the server 110 may receive the domain search terms. The domain search terms may obtained from the user device 102 via an interface, or from another source. As described above, the domain search terms may already be delineated upon receipt, such as when the user enters keywords separated by a space, comma, or other character, as the domain search terms. In this case, to tokenize the search terms at step 304, the server 110 may simply identify the delineated words and n-grams thereof as the tokens. Where the domain search term is instead a single string, at step 304 the server 110 may tokenize the domain search term by identifying the SLD, if necessary, and applying a string matching algorithm to the domain search term, as described above, to produce the tokens. The server 110 may eliminate tokens that are on the stop word list as described above. If there are multiple tokens, the server 110 may additionally build a token index to store the tokens and data acquired from the subsequent steps of the method 300. The server 110 may additionally store the domain search information in the search logs 120 and store the domain search term(s) and/or token index in the corpus.

At step 306, for a first time interval (e.g., time interval 200 of FIG. 2) to be evaluated, the server 110 may calculate the search frequency 210 for a first of the identified tokens. In one embodiment, the search frequency 210 is an integer count of the number of times the token appears in the searches of the corpus 220, which may for example comprise all previous domain searches in the search logs 120 for the first time interval 200. The server 110 applies a regular expression or other string matching algorithm to each of the searches to determine if each one contains the token, or contains an arrangement of the words in the token that meets the tolerances of word order and proximity as described above. If so, the search frequency 210 is incremented.

At step 308, the server 110 may normalize the search frequency 210 for the time interval 200 to obtain an interval demand, which is the demand for the token for the time interval 200. Any of the normalization techniques described above may be used to generate one or more normalization factors that modify the raw count of occurrences of the token. For example, the inverse document frequency (IDF) of the token may be calculated, and the search frequency 210 may be multiplied by the IDF. In this context, the IDF may be a function of the number of previous searches in which the token appears compared to the total number of previous searches. In one embodiment, the server 110 may then store the calculated interval demand for the time interval 200 until all interval demands for all tokens across all time intervals are calculated, before proceeding to steps 314 or 316 described below. In other embodiments, the server 110 may progressively perform the composite calculations of steps 314 and/or 316 as each interval demand is obtained.

If there are additional time intervals to be evaluated, at step 310 the server 110 identifies the next time interval (e.g., time interval 202 of FIG. 2) and returns to step 306. If there are no additional time intervals to be evaluated for the current token, at step 312 the server 110 identifies the next token and returns to step 306. If there are no more tokens requiring search frequency calculation, the server 110 determines whether there are multiple tokens. If there is only one token in the domain search term, the server 110 computes the overall demand (step 316) as described below.

If there are multiple search tokens, the overall demand for the domain name may depend partly or wholly on the demand of the individual tokens. Therefore, at step 314 the server 110 may apply one or more composite ranking functions to weight the interval demands in each time interval of the non-overlapping tokens against each other and produce a composite demand for each time interval. A composite ranking function may compare each of the pairs of tokens, or all tokens together, using any suitable ranking function. Non-limiting examples include: simple average of each token's interval demand; weighted average of each token's interval demand; an n-gram language model of term co-occurrence; a similarity function that implements the divergence from randomness framework; an information based similarity function; or another suitable ranking function.

At step 316, the server 110 may compute the overall demand for the domain search term. The overall demand is a function of the interval demands of the tokens, taken over all or a subset of the evaluated time intervals. As described above, the time intervals may be weighted according to their length and/or recency. Thus, a weekly demand or a daily demand from seven days previous may have less impact on the overall demand than the daily demand for the current day. The overall demand may be computed according to default parameters, or to parameters set by a user or administrator. Exemplary default parameters may cause the server 110 to take the average of all computed demands—which are the interval demands of the token if there is only one token, or the composite demands if there are multiple tokens—for the desired intervals, each modified according to an interval weight, to calculate the overall demand. In some embodiments, the overall demand may be progressively calculate as each interval demand or composite demand is obtained. In some embodiments, a market segment parameter may further modify the overall demand according to one or more characteristics of the market segment. For example, a market segment may be a geographic region, and the overall demand for domain names having a TLD that is relevant to the geographic region (e.g., the geographic region of India may favor the .in TLD more heavily than any other region) may be increased relative to domain names with other TLDs.

At step 318, the server 110 may optionally present the overall demand in a user interface accessible from the user device 102. The user interface may be configured to present options and receive input from the user, and the server 110 may receive the input and modify data associated with the user's account. For example, the user interface may include domain name watch lists, to which the user may add domain names. The user interface may display the domain demand in the watch lists. In another example, the server 110 may compile historical demand data obtained from the demand data store 150 (see FIG. 1) and render graphical representations of the domain data, such as graphs of demand values over time, to the user interface.

Figures 4, 5:
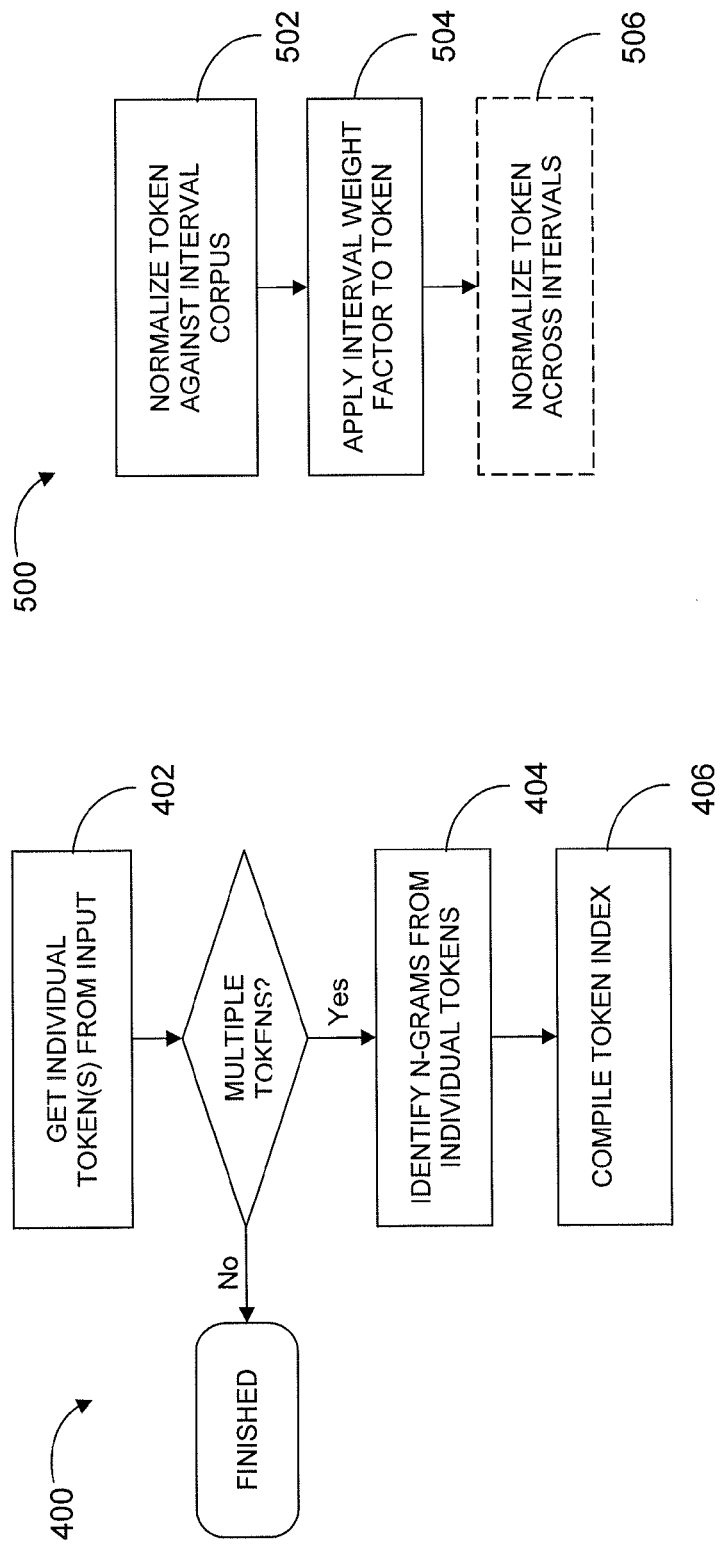
FIG. 4 is a flow diagram of an embodiment of a method for identifying tokens from an input.
FIG. 5 is a flow diagram of an embodiment of a method for normalizing a token demand in accordance with the disclosure.

FIG. 4 illustrates a method 400 for tokenizing a domain search string, as in step 304 of FIG. 3. At step 402, the server 110 may parse the input domain search string into individual tokens using a string matching algorithm as described above. Tokens may have a minimum length, such as two or three characters, and a maximum length of 63 characters to satisfy domain naming standards. The domain search string as a whole may be identified as one of the tokens. If there are multiple tokens in the input domain search string, at step 404 the server 110 may generate, as tokens, n-grams for each combination of two or more words. N-grams may be limited by length, number of words, order or words, and/or proximity of words as described above. At step 406, the server 110 may compile an index of all identified tokens.

FIG. 5 illustrates a method 500 for normalizing the search frequency of a token, as in step 308 of FIG. 3. At step 502, the server 110 may normalize the token search frequency against the corpus of the interval being evaluated, using IDF, TF-IDF, or another normalization technique or combination of techniques. At step 504, the server 110 may multiply the normalized search frequency by the weight factor for the interval to obtain the interval demand for the token. At step 506, the server 110 may optionally normalize the token interval demand across additional intervals that have had their interval demands calculated. This step 506 is applicable when, for example, the overall demand for the domain search term or an overall demand for the token is being progressively calculated rather than averaged once all interval demands have been calculated.

The calculated overall demand for the domain name is an indicator (e.g., to a user) of how many people have recently been looking to buy the domain name. Components of the overall demand can also be indicators of other activities, such as change in demand over a certain time period and demand for certain words and phrases within the domain name, which may overlap with other domain names that have a calculated overall demand. The overall demand and components thereof may be stored (e.g., by the server 110 in the demand data store 150) at any point in the demand calculation processes. The demand in any past time interval can be retroactively calculated, provided the data logs 120 contain complete records of the domain searches performed in that time interval. The overall demand and components thereof, including for any particular time interval, may be correlated to domain name pricing and appraisal processes, as described further below.

Domain name pricing, as used herein, is the process of determining a suitable price to charge a user to register a particular domain name. Domain name pricing typically includes an appraisal of the domain name. Appraisal is the process of determining what the domain name is worth, based on information about the sales and offers for sale of similar domain names. The suitable price may not be equal to the appraised value—there is often a difference between what the domain is worth and what it is likely to be sold for, particularly considering there are various sale mechanisms, including firm pricing, "best offer" pricing, domain name package sales, and auctions. The present systems and methods provide improvements to known appraisal and pricing processes.

Central to an appraisal is an identification of similar domain names. Multiple indexes may contain relevant similar domain names, and each index may be stored by the server 110 in data stores, or may themselves be data stores made accessible to the server 110 by another server that may or may not be controlled by the party controlling the server 110. Referring again to FIG. 1, the indexes may include a registered domain index 130 and an aftermarket index 140. The registered domain index 130 contains records for each domain name that is currently registered and thus has been purchased at least once. The registered domain index 130 may further include records for domain names that were once registered but expired. Some or all of the records in the registered domain index 130 may include sales history data for the associated domain name, including the date, sale price, and sale type each time the domain name was sold. It will be understood that the sales history data may be incomplete because sales history data for domain names is not required to be public. In light of that, the present systems and methods may be advantageously implemented by a registrar or domain reseller, which may have the sales history data for at least the first sale of every domain name it has sold.

The aftermarket index 140 contains records for domain names that are currently being offered for sale in one or more domain name aftermarkets. The records may include sales history data for the domain name, including data as described above for past sales as well as the current sale. The sales history data may also include the length of time the domain name has been available in the aftermarket. The type of sale may affect the available sales history data. Of particular use for the present appraisal process, if the sale type is an auction, the sales history data may include both a start price and a current or end price for the auction.

Multiple factors may be correlated to determine a similarity of an existing domain name to a target domain name, including without limitation: commonality (i.e., overlap) of tokens, meaning the domain names have one or more of the same tokens in them; token coverage, which is the percentage of the length of each SLD that is occupied by common tokens; temporal similarity of sale or offer dates (i.e., for a target domain name being offered for sale immediately, the most recent sales are the most temporally similar); and type of sale. The present systems and methods may further include similarity of demand as a correlation factor or subfactor. In most cases it may not be feasible to use similarity of demand due to the resources requires to compute the demand for every domain name in the target indexes 130, 140. However, in some embodiments the records in the indexes may include a stored overall demand for the associated domain name. Demand comparison may be a subfactor of another correlation factor. For example, the server 110 may identify all domain names in the indexes 130, 140 sold within the last one hour, and the server 110 may compute the overall demand for each of those domain names.

Once similar domain names are identified, a process referred to herein as collaborative price filtering may be applied. Collaborative price filtering is a comparison of sales history data between the identified similar domain names to obtain an expected sale price or price range for the target domain name. Collaborative price filtering may be performed on all or a subset of the similar domain names. A collaborative price filter may be set to include only sales history data matching certain parameters, such as type of sale, sale date or date range, number of common tokens, token coverage, particular common tokens, and the like. Additionally or alternatively, collaborative price filtering may include removing the sales history data for similar domain names, or attenuating the weight thereof in the price calculus, if the sale parameters are outside of a threshold defining a relevant sale. For example, a similar domain name may be removed or have a reduced weight if its most recent sale is too old (e.g., over 90 days) or if its sale price is significantly higher or lower than sale prices of domain names with similar sales parameters.

Parameters of a domain sale may vary greatly, such that any two prior sales may both be relevant to determining the suitable price, but cannot be directly compared. For example, the sale price may be very different between a direct sale and an auction, or between a sale yesterday and a sale seven days ago. Collaborative price filtering may therefore include normalization of the sale prices. Sale prices may be normalized according to one or a combination of parameters, including without limitation: the sale type; the sale date; the offer (initial) price; the time on market; the common token(s) between the similar domain names; the overall demand at time of sale; and the demand of a common token at the time of sale.

The demand for a particular token may be used with other collaborative parameters to identify a suitable price for the target domain name continuously and in real-time, so that the accuracy of the pricing process is self-sustaining. This is achieved by using the current demand for the token to normalize the past sale prices. This normalization may be performed in absence of, in conjunction with, or after normalization of the sale prices using other parameters. An illustrative example is as follows: with the set of similar domain names containing the token identified, and the sale date and sale price for each of the identified domain names retrieved, the demand for the token in a suitable time interval (e.g., one week) around each sale is obtained as described above; then, each sale price is normalized based on the difference between the token demand at the time of sale and the current token demand; finally, the suitable price is calculated from the normalized sale prices.

Figure 6:
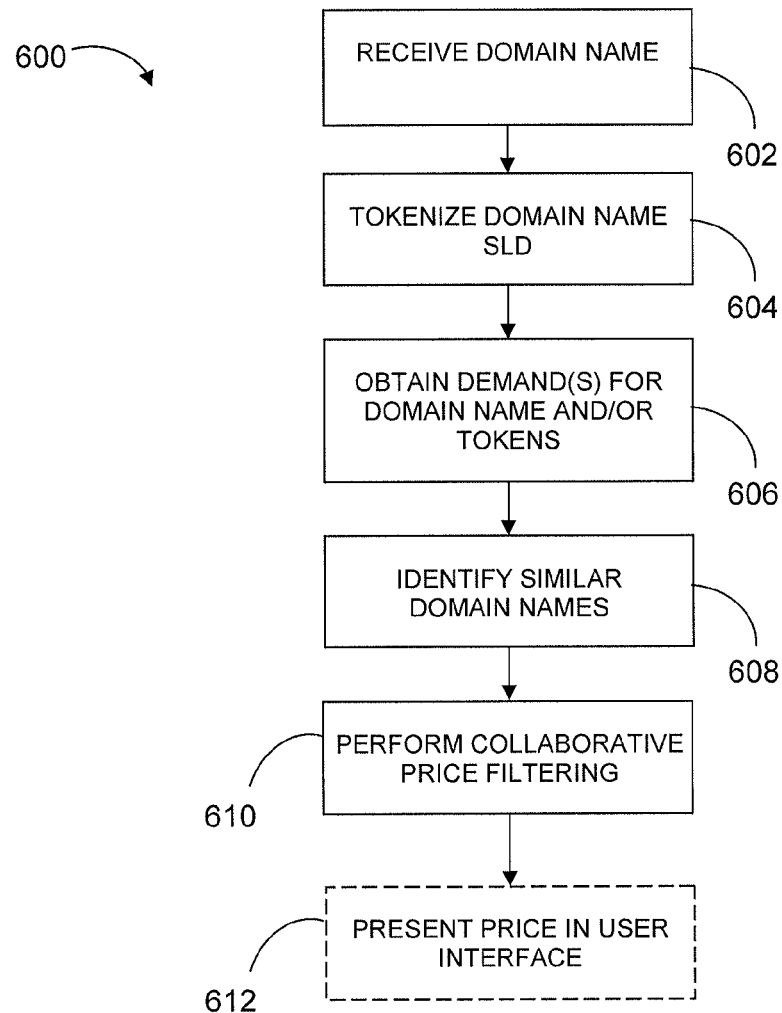
FIG. 6 is a flow diagram of an embodiment of a method for automatically generating a suitable price for a target domain name.

FIG. 6 illustrates a method 600 of determining a suitable price for a particular domain name. At step 602, the server 110 may receive the target domain name to be priced. At step 604, the server may generate tokens from the SLD of the target domain name using any suitable methodology, such as that described above with respect to step 304 of FIG. 3 and method 400 of FIG. 4. At step 606, the server 110 may use the processes described above to obtain the current overall demand for the domain name and, additionally or alternatively, the demand for one or more of the tokens.

At step 608, the server 110 may identify one or more similar domain names by comparing the indexes (e.g., registered domain index 130 and/or aftermarket index 140). In one embodiment, similarity may be token similarity, and a domain name in one of the searched indexes may be identified as similar if it contains a predetermined number (e.g., one or more) of the tokens. Similarity may further be determined by comparison using sub-parameters to token similarity, such as recency of sale, type of sale, and/or similarity of overall demand. Similarity on the sub-parameter level may be absolute (i.e., thresholded) or weighted. In an example of absolute similarity, a domain name in one of the indexes having one common token may only be identified as similar if the sale date is less than seven days in the past. Using weighted similarity, a domain name sold yesterday may simply be considered "more" similar than one having the same common token and having been sold eight days ago. One or more of the sub-parameters may alternatively be co-parameters with token similarity, and may have equal or varying weights. That is, in some embodiments, certain parameters may be considered more valuable for determining which domain names are most similar to the target domain name.

Figure 7:
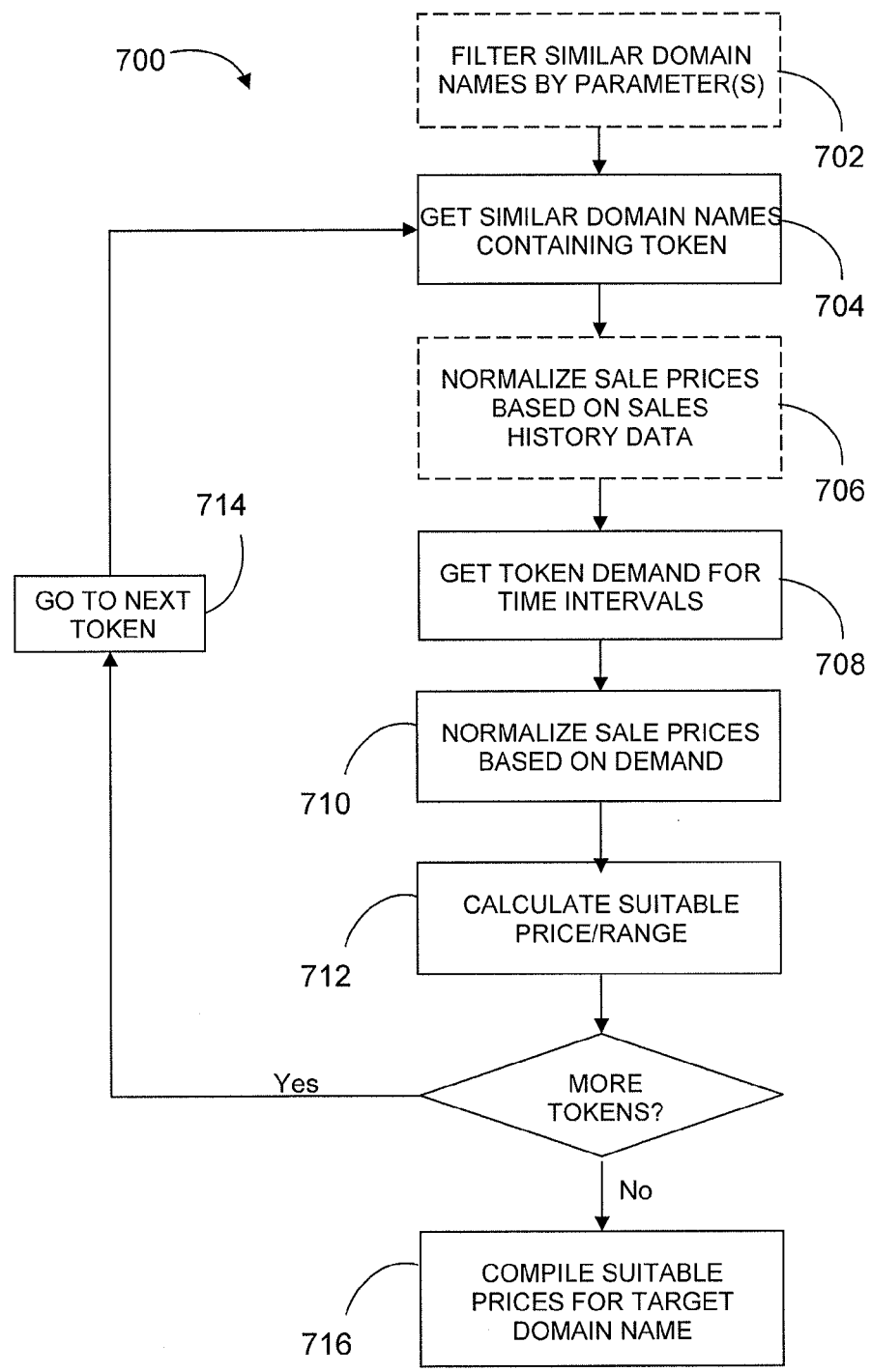
FIG. 7 is a flow diagram of an embodiment of a method for collaborative price filtering of similar domain name sale prices.

At step 610, the server 110 may perform collaborative price filtering of the identified similar domain names. As described above, filters may be applied to the similar domain names based on their sales history data to identify a set of the similar domain names having sale and/or offer prices that can be used to determine the suitable price for the target domain name. FIG. 7 illustrates an exemplary method 700 of collaborative price filtering to determine the suitable price. Variations of the method 700 of FIG. 7 may be used to filter and/or interpret sales history data as a means of identifying the suitable price, depending on the sales history data available and the desired implementation.

At step 702, the server 110 may filter the similar domain names based on one or more parameters of the sales history data. The filtering may simply be used to eliminate similar domain names that have incomplete sales history data, or more complex filters, such as those described above, may be applied. The filtering (step 702) may be skipped entirely when warranted, such as if there are few similar domain names, or if the server has complete sales history data for all of the similar domain names. At step 704 the server may use a string matching algorithm (e.g., Aho-Corasick), regular expression, or other suitable comparison method to obtain the set of similar domain names containing a first of the tokens. The set of similar domain names may be obtained from all of the identified similar domain names (e.g., at step 608) or from the filtered set thereof if step 702 is performed first. In another embodiment steps 702 and 704 may be performed in the opposite order, with the server 110 first obtaining the set of similar domain names containing the token and then filtering the set.

At step 706, the server 110 may normalize the sale prices for the set of similar domain names based on the sales history data. Any one or combination of parameters of the sales history data may be used to normalize the sale prices. For example, if actual historical sale prices are not available, the sale price may be estimated or interpolated from one or more initial offer prices in one or more auctions for the domain name. Any normalization technique or combination of techniques that adjusts the body of past sale prices to improve comparisons to current market value may be used, including without limitation: average or weighted average using some or all records; TF-IDF of the token and/or other words or phrases in the similar domain name against a corpus of sold and/or aftermarket domain names; price index(es) or other sale quantity models retrieved from another data source or calculated from available domain sale records; and integration of output from other appraisal algorithms. In one example, sale prices may be normalized by sale date for each sale by selecting a normalizing time interval (e.g., one day) and calculating an average sale price for a desired number of the normalizing time intervals and for each sale type using the sale prices of the similar domain names sold in that time interval. A trend of average sale prices for each sale type can be used to predict the current market value. Average sale price trends of different sales types can be compared to or normalized against each other, potentially helping the user select a sale type for his own sale.

At step 708, the server 110 may obtain the demand for the token in each relevant time interval. The server 110 may query a data store of demand history data (e.g., demand history data store 150 of FIG. 1) and retrieve the token demand if it was previously calculated, or the server 110 may calculate the token demand as described above. The time interval may be a suitable length (e.g., twelve hours, one day, one week) such that the token demand calculated for the time interval is a reliable representation of the quantity of domain searches performed using the token at the time of a past sale. A discrete time interval (i.e., a particular instance having a particular date and time) is relevant if it has a certain number of sales (in any case, at least one sale) of similar domain names in it. The discrete time intervals may be the same as those used to perform the first normalization of the sale prices (step 706) if one was performed.

At step 710, the server 110 may normalize the sale prices based on the token demand for the corresponding interval. The demand normalization may be performed on the raw sale price of each similar domain name, or on the sale price(s) as normalized at step 706. Using normalization of the raw sale price for purposes of description, at this point the server 110 has determined the sale price of the similar domain name, the token demand at the time of sale, and the current token demand. Based on these values, the server 110 may use a pre-set or heuristic correlation, such as a linear regression, between sale price and token demand to obtain the expected sale price for that similar domain name at the current demand level. In another embodiment, the step 710 may produce a tuning factor that may be used in step 712 to refine the calculation of the suitable price so that it incorporates the difference in token demand between the sale date and current date.

At step 712, the server 110 may calculate the suitable price or price range for the target domain name as a function of (1) the sales history data for similar domain names containing the evaluated token, and (2) the demand for the evaluated token. If there are additional tokens to evaluate, at step 714 the server 110 identifies the next unevaluated token and returns to step 704 to evaluate it. Thus, the suitable price is calculated on a token-by-token basis. At step 716, the server 110 may compile the calculated (at step 712) token-based prices/ranges to produce an overall suitable price or price range for the target domain name. In one embodiment, the token-based suitable prices may be averaged to produce the overall suitable price. In another embodiment, the token-based prices may be weighted based on the relative current demands of the tokens. In another embodiment, the token-based prices may be weighted based on the proximity of each token demand to the overall demand for the target domain name, calculated as described above. That is, the closer a token's demand is to the overall demand, the more weight is given to the corresponding token-based price when calculating the overall suitable price.

Referring again to FIG. 6, with the overall suitable price calculated, at step 612 the server 110 may present the suitable price in a user interface on the user device 102. The user interface may be configured to present options and receive input from the user, and the server 110 may receive the input and modify data associated with the user's account. For example, the user interface may include information regarding the user's domain name portfolio (i.e., domain names the user owns). The user interface may display the suitable price in the portfolio.

Systems and methods of the present disclosure can be used to improve the speed and reliability of candidate domain name generation during a domain search by generating, through continuous expansion and indexing of a corpus of domain name documents, a domain name inventory that represents the semantic web. In accordance with the detailed description below, the present disclosure describes a domain crawler and indexer that generates and indexes domain names using a combination of domain spinning concepts and "web crawling" concepts. Relevant domain spinning concepts include those described above, and use semantic indexes and other data sources to generate variations on tokens and combine the variations into new domain names.

"Web crawling" is a term known in the art to describe automated identification of new web pages using a list of "seed" URLs. A web crawler, which is an automated software application, visits each of the seed URLs, locates hyperlinks in the document hosted at the seed URL, and adds the referenced URLs from the hyperlinks to the list of URLs to visit. The web crawler or a separate indexing program may then visit the URLs in order to retrieve and index (i.e., for web search engines) the content of the documents. One method of this type of indexing includes generating metadata tags to describe the web content and storing the metadata tags in the index with the URL.

The domain crawler may spin new domain names and add them to the domain inventory as described below in a substantially continuous manner. That is, as long as the servers implementing the domain crawler are powered on and have available computing resources, the domain crawler may be adding to the domain inventory. As stated above, a domain name has an SLD limited to 63 characters and a TLD selected from a finite set of TLDs, there is therefore a finite number of possible character combinations, and an even smaller number of combinations that are not gibberish, that can comprise a domain name. Thus, over time, the domain inventory may store a record for every possible combination of tokens that can form a domain name, in any language. Further, the record for each domain name may include metadata that describes the connection of the domain name to one or more of the other domain names. The metadata may be a pointer or other reference to the record of the connected domain name, or may be the domain name itself or another suitable metadata element. In one aspect, the metadata may include a relevance value, such as a ranking or domain demand as described herein. The domain inventory may thus be represented as a directed graph comprising domain names as vertices and connections from one domain name to another as directed edges between the vertices. Subsequently, when a domain search is performed using the domain inventory, the directed graph may be traversed at search time to produce, as candidate domain names, a set of connected domain names. It will be understood that at any particular time, the domain graph may include many groups of connected vertices but no connections between the groups, but as the domain inventory develops and domain names are added, some or all of the groups will connect with each other. The traversal may be aided by the relevance values stored in the record associated with the vertex. For example, a system traversing the directed graph may order the connected records by relevance value and traverse the edge representing the highest relevance from the first record to the connected record.

Referring again to FIG. 1, the domain crawler may be installed or implemented on the server 110 (see FIG. 11) and may configure the server 110 to generate the domain inventory and perform retrieval, updating, and storage of the domain inventory in an inventory data store 160. The domain inventory may be stored as any suitable data structure or data store, wherein the records for the domain names can be associated with each other as a directed graph. In one embodiment, each domain name may be included in a record along with metadata pertaining to the domain name and useful to the search algorithm. Non-limiting examples of such metadata include a list of the tokens in the domain name, availability of the domain name (i.e., whether the domain name is registered), expiration date of the current registration, and the like. The domain crawler may receive incoming domain search queries (e.g., from user device 102 via a search interface) as "seed" domain names. The domain crawler may additionally or alternatively acquire seed domain names from other data sources, such as the search logs 120, the registered domain index 130, and the aftermarket index 140. In some embodiments, the server 110 may have access to one or more DNS data stores 170. The DNS data stores 170 may include DNS access and routing logs, DNS resource records, and other data stores maintained by a public/resolver DNS server, yielding data such as the internet protocol (IP) address of the querying device, time of the query, and domain name requested in the query. The server 110 may access and/or query the DNS data stores 170 at any suitable frequency for acquiring the data therefrom. The domain crawler may use semantic data stores 180 accessible by the server 110 to spin candidate domain names from tokens as is known in the art. Semantic data stores 180 may include electronic dictionaries and encyclopedias (e.g., WIKIPEDIA), conceptual databases (e.g., FACTUAL), knowledge bases, and other suitable sources of semantic and conceptual relationship data.

Figure 8:
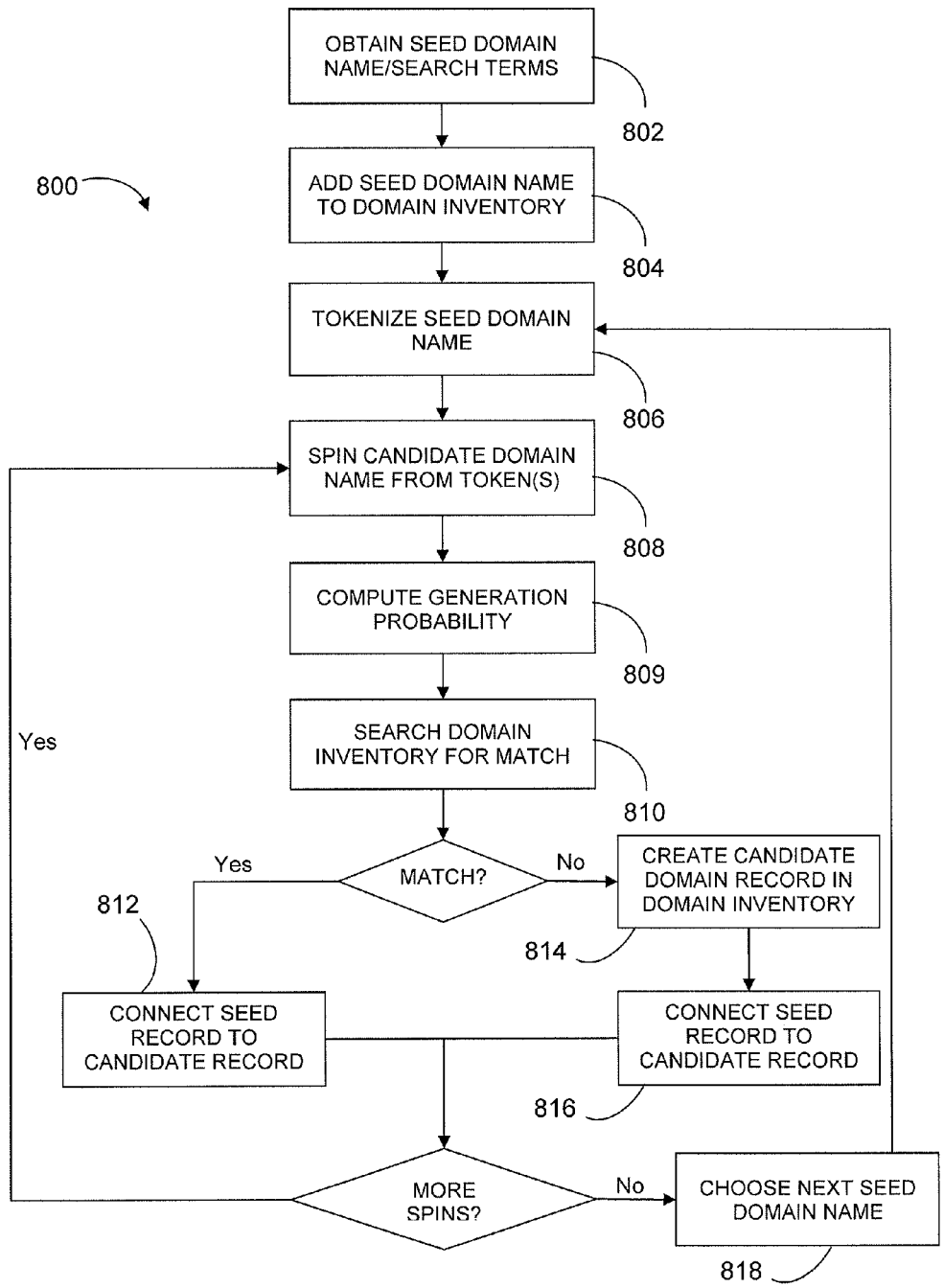
FIG. 8 is a flow diagram of an embodiment of a method for continuously generating a domain inventory.

FIG. 8 illustrates a method 800 for adding domain names as records in the domain inventory. At step 802, the domain crawler may receive a seed domain name from a domain search or a connected data store. In this method 800, the seed domain name received at step 802 is presumed to not already be in the domain inventory, so at step 804, the domain crawler may add a record for the seed domain name to the domain inventory. This adds to the domain graph a new vertex that may be unconnected until further processing is performed. At step 806, the domain crawler may tokenize the seed domain name, using any suitable method such as the methods described above.

At step 808, the domain crawler may spin a candidate domain name from one or more of the tokens identified at step 804, using any suitable domain name spinning algorithm including those described herein. At step 810, the domain crawler may determine whether a domain inventory record, and thus a domain graph vertex, already exists for the candidate domain name, by searching the domain inventory for a matching record. If a record for the candidate domain name already exists, at step 812 the domain crawler stores the connection to the candidate domain name's record in the metadata for the seed domain name's record. The new record containing the seed domain name is thus represented by a vertex that can be connected to an existing portion of the domain graph. The new vertex also, at this point, represents a vertex on the "domain frontier" (see below) if additional domain spinning can be done.

If there is no match of the candidate domain name to a record in the domain inventory (step 810), at step 814 the domain crawler creates a new record in the domain inventory and stores the candidate domain name and any associated metadata therein. At step 816, the domain crawler stores the connection to the candidate domain name's record in the metadata for the seed domain name's record. The new vertices containing the seed domain name and the candidate domain name thus form a group of connected vertices which may at first be unconnected to any other group in the domain graph.

After steps 812 or 816, if additional spinning on the tokens of the seed domain name can be done, the domain crawler may return to step 808. If no additional spinning is to be done, the method 800 may be made continuous by selecting a new seed domain name at step 818 and then returning to step 806. The new seed domain name may be any of the candidate domain names spun from the previous seed domain name, particularly any of those that were added to the domain inventory in the just-completed iteration of the domain crawling process.

In another embodiment of the method 800, the domain crawler may first determine whether the initial seed domain name is already in a domain inventory record. That is, the domain crawler may search the domain inventory as in step 810 and, if the seed domain name is not present, may create a record for the seed domain name as in step 804. If the seed domain name is present, the domain crawler may use the connections of the seed domain name in the domain name inventory to advance itself to the "domain frontier," which is any node that needs additional domain spinning of the associated domain name. The record for any domain name in the domain inventory may include metadata describing the "spin status" of the associated domain name, including parameters such as the number of candidate domain names spun, the tokens on which candidate domains have or have not been spun, the date of the last token spin, and other parameters that may indicate to the domain crawler whether additional spinning of the domain name should be performed. The domain crawler may proceed from the record of the seed domain name to any of the vertices connected to the seed domain name's vertex, and subsequently move along the interconnected vertices until the domain frontier is reached.

The domain inventory records may contain additional metadata that may be useful for domain search engines attempting to retrieve candidate domain names from the domain inventory. Non-limiting examples include: domain name availability (e.g., a flag indicating whether the domain name is registered); number of outgoing and/or incoming connections; an index of the tokens in the domain name; the domain name demand as calculated above; a domain appraisal or price as calculated above; other content of the domain name, such as whether the domain name contains hyphens, numbers, or other particular characters; the type or source of the domain name, such as an aftermarket or premium designation; and the date of the last domain name transfer, such as by purchase or expiration. While performing the method 800, the domain crawler may additionally update any of the metadata of a domain inventory record it is analyzing. For example, the domain crawler may check the availability of the domain name and update the availability flag if the domain name's registration status has changed.

Systems and methods of the present disclosure can be used to improve the speed and reliability of candidate domain name generation during a domain search by ranking candidate domain names collected from a plurality of sources. The ranking methodology provided herein may operate in real-time in a domain search environment, such as the system of FIG. 1. That is, the ranking of domain search results (i.e., candidate domain names) from disparate sets may occur in response to the initiation of the domain search. This provides the most currently relevant ranking possible. The disparate sets may be produced from any suitable data store containing domain names, or may be produced on the fly (i.e., in response to the domain search input) such as by applying one or more domain spinning algorithms to the domain search terms. Non-limiting examples of suitable data stores include the search logs 120, the registered domain index 130, the aftermarket index 140 and/or another domain name index (e.g., a ccTLD index), the DNS data stores 170, and the domain inventory data store 180.

Figure 9:
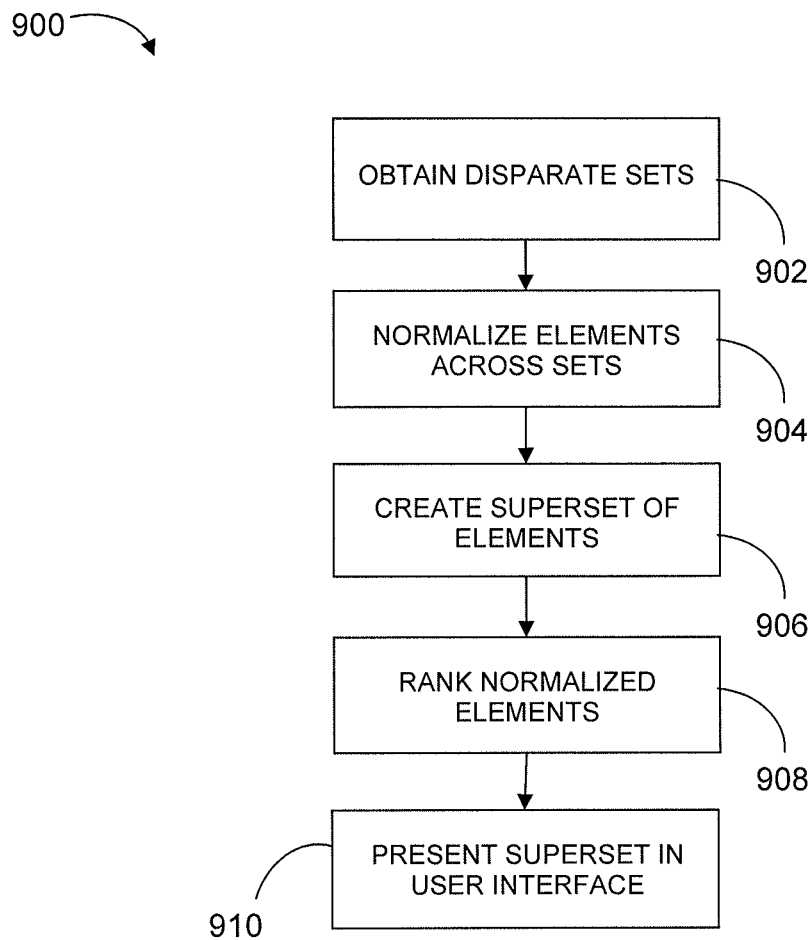
FIG. 9 is a flow diagram of an embodiment of a method for ranking elements of disparate sets across the disparate sets.

The server 110 may be configured to perform the method 900 of FIG. 9 for ranking the elements of the disparate sets together in a single superset. The elements are described herein as candidate domain names, but it will be understood that the ranking methodology may be applied to search results for other types of name assets, such as screen names, user names, and handles, as well. At step 902, the server 110 may obtain the disparate sets of candidate domain names in any suitable manner and from any desired domain name source. Detailed examples of creating the disparate sets by spinning and/or searching for candidate domain names based on input keywords are described below; the server 110 may additionally or alternatively obtain some or all of the disparate sets already populated with candidate domain names by servers inside or outside of the system.

The number of candidate domain names within the disparate sets may be equal or unequal. Maximum and minimum numbers of elements may be set. The number allowed or required may be prescribed by the parameters of the search. For example, if ten candidate domain names will be displayed to a user as the results of the user's domain search, the server 110 may require at least ten candidate domain names in each of the disparate sets, to accommodate the extreme scenario when all ten of the highest ranking candidate domain names across all of the disparate sets come from the same set.

Each of the disparate sets may already be ranked internally, using common or varied ranking functions, when the disparate set is obtained in step 902. The ranking methodologies used at the source data stores for the disparate sets may produce different results—that is, a ranking function used at the data store for a first disparate set may, when used on a second disparate set, produce a differently ordered list or a different range of scores for the second disparate set than that produced by the ranking function used at the data store of the second disparate set. In some cases, a ranking function for one set may be unusable for another set. Thus, at step 904, the server 110 may normalize the ranks of the candidate domain names of the disparate sets. The candidate domain names may be normalized with respect to one parameter or multiple parameters, and the selection of normalization parameters may depend on the type and format of data available from the selected data sources. The candidate domain names may be normalized according to the relative ranking scales and/or values applied to the disparate sets. In some embodiments, the normalization may solely or primarily depend on token frequency. A TF-IDF normalization is applied in the specific example described below, but the server 110 may additionally or alternatively use other normalization techniques including, without limitation, calculating a domain demand, price, relevance value, or language model using the processes described above or other suitable processes. In some embodiments, the server 110 may advantageously apply pointwise mutual information (PMI) normalization techniques to the candidate domain names.

At step 906, the server 110 may create the superset and populate it with the normalized candidate domain names from the disparate sets and any suitable metadata stored with the candidate domain names. In some embodiments, the superset may include all of the candidate domain names in each of the disparate sets. In other embodiments, only a portion of the candidate domain names from one or more of the disparate sets may be selected for inclusion in the superset, according to a selection criteria that may include a certain number of highest ranked candidate domain names according to the native ranking system of the data source, a certain number of highest scoring normalized candidate domain names, or other criteria. At step 908, the server 110 may apply one or more ranking functions to the normalized candidate domain names in the superset as described further below. At step 910, the server 110 may present all or a portion of the superset of candidate domain names to the user via the user interface.

Figure 10:
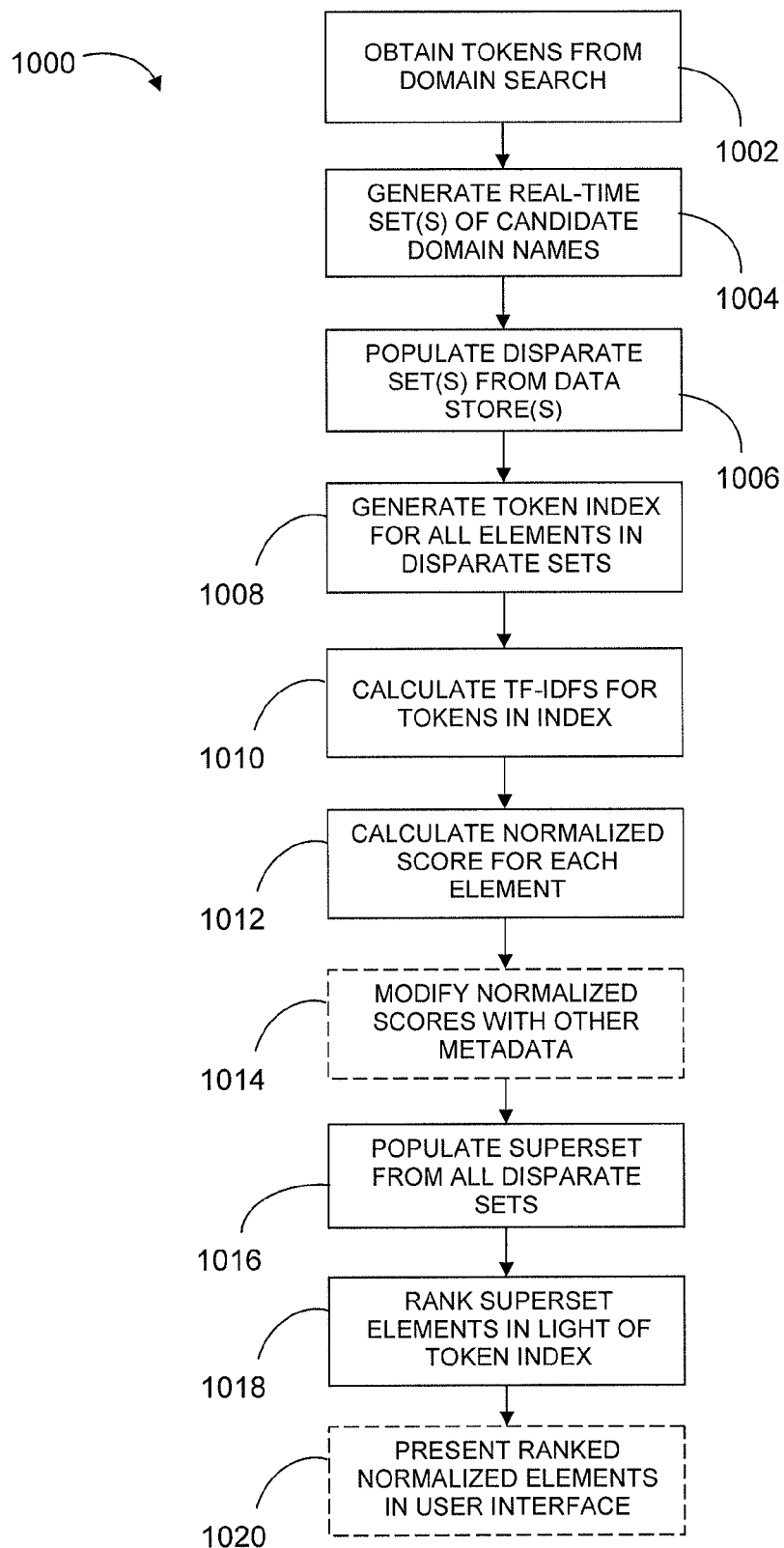
FIG. 10 is a flow diagram of another embodiment of a method for ranking elements of disparate sets across the disparate sets.

FIG. 10 illustrates an embodiment of a particular method 1000 for implementing the method of FIG. 900. The method 1000 ranks candidate domain names or other elements of a plurality of disparate sets that includes at least one set of candidate domain names that are generated in real-time in response to a domain search query, and that may further include at least one set of candidate domain names that were extant or pre-generated before the domain search is received. At step 1002, the server 110 may obtain the tokens from the input domain search using any of the methods described above (see e.g. FIG. 4). At step 1004, the server 110 may generate one or more real-time sets of candidate domain names using any suitable domain spinning algorithm for the received tokens. For example, if there are two tokens T1 and T2 in the domain search, the server 110 may use the following algorithm to generate 120 candidate domain names in a first real-time set:

generate ten candidate domain names using T1 combined with each of ten spun variations of T2;

generate ten candidate domain names using each of ten spun variations of T1 combined with T2;

generate one hundred candidate domain names using each of ten spun variations of T1 combined with each of ten spun variations of T2.

Different algorithms may be used to generate different real-time sets of candidate domain names. For example, one of the real-time sets may use the domain inventory described above to generate a second real-time set. The real-time sets may be internally ranked according to any suitable ranking function. For example, the second real-time set described above is internally ranked using the generation probabilities of the domain graph. Any two real-time sets generated or ranked using different algorithms may be considered disparate from each other.

At step 1006, the server 110 may populate additional disparate sets of candidate domain names obtained from other data stores. In one example, the server 110 searches the aftermarket index 140 of FIG. 1 using the obtained tokens to retrieve one hundred candidate domain names that contain one or more of the tokens. The candidate domain names from the data stores may be internally ranked. For example, the candidate domain names obtained from the aftermarket index 140 may be ranked according to similarity to the tokens.

At step 1008, the server 110 may generate a token index by tokenizing each of the candidate domain names in each of the disparate sets (see, e.g., FIG. 4) and adding each of the tokens (i.e., words or n-grams) to the token index. At step 1010, the server 110 may, in conjunction with building the token index or subsequently thereto, calculate a TF-IDF for each of the tokens in the token index using the corpus of all candidate domain names in the disparate sets as the documents. Using at least the TF-IDFs for the tokens, at step 1012 the server 110 may calculate a normalized score for each of the candidate domain names. In one embodiment, the normalized score may be the sum of the TF-IDFs of the tokens in the candidate domain name. In another embodiment, the normalized score may be the product of the TF-IDFs of the tokens in the candidate domain name. In other embodiments, the TF-IDFs may be used to normalize the internal ranking of the candidate domain names in the disparate sets. For example, for each candidate domain name, the server 110 may multiply each token's TF-IDF by the internal rank value and then sum the results for all tokens. The normalization of the candidate domain names may change the order in which the candidate domain names are internally ranked, but at least the normalized score of each candidate domain name allows the candidate domain name to be compared to candidate domain names from disparate sets.

At step 1014, the server 110 may optionally modify the normalized scores with additional metadata of each of the candidate domain names. The metadata may describe features of the candidate domain name that contribute to the relevance of the candidate domain name to the domain search query and/or contribute to the value of the candidate domain name to the user. The metadata may be obtained from the data stores together with the candidate domain names, or the metadata may be generated by the server 110. In some embodiments, the metadata may be used as a filtering means. For example, the metadata may include a domain price (e.g., as calculated above) and the step 1014 may include applying a filter to the disparate sets that excludes candidate domain names having a price in excess of a predetermined amount (in other embodiments, filters such as the price filter may be applied at step 1006 when the candidate domain names are being selected for inclusion in the disparate sets). In some embodiments, the metadata may be used as a scalar of the normalized score. For example, the metadata may include a domain demand (e.g., calculated as described above) and the step 1014 may include multiplying the normalized score by the domain demand. The modifications of step 1014 may again change the order of the internally ranked candidate domain names.

At step 1016, the server 110 may populate the superset of candidate domain names from the disparate sets. In some embodiments, the server 110 may include all of the candidate domain names in the superset. In other embodiments, the server 110 may populate the superset with all candidate domain names having a normalized score (or a metadata parameter) over (or under) a threshold value. In other embodiments, the server 110 may populate the superset with a predetermined number of candidate domain names, which may be selected according to highest normalized score across all disparate sets, or by selecting a certain number of the highest scoring candidate domain names from each of the disparate sets. In other embodiments, the disparate sets themselves may be weighted relative to each other, and the server 110 may account for the weight of each disparate set when selecting candidate domain names for inclusion. For example, the domain search parameters may indicate that the user prefers previously registered domain names, and the disparate sets from the aftermarket index and other preexisting sources may be weighted higher than the real-time sets. The server 110 may be configured to scale up the normalized scores of the higher weighted indexes, and/or may be configured to select a higher number of candidate domain names from the higher weighted index.

At step 1018, the server 110 may rank the candidate domain names of the superset according to relevance of the candidate domain names to the tokens of the domain search. Any suitable ranking function may be used to rank the candidate domain names, including without limitation an information retrieval function or set of functions such as Okapi BM25. The server 110 may use the token index, as formed in step 1008 or as modified in step 1010, as a component of the ranking function. The resulting ordered list of candidate domain names in the superset constitutes the most relevant candidate domain names to the search query, taken from disparate domain name sources and modified according to the search parameters, if any. At step 1020, the server 110 may present the ranked, normalized candidate domain names of the superset in a user interface, e.g. on the user device 102 of FIG. 1.

Figure 11:
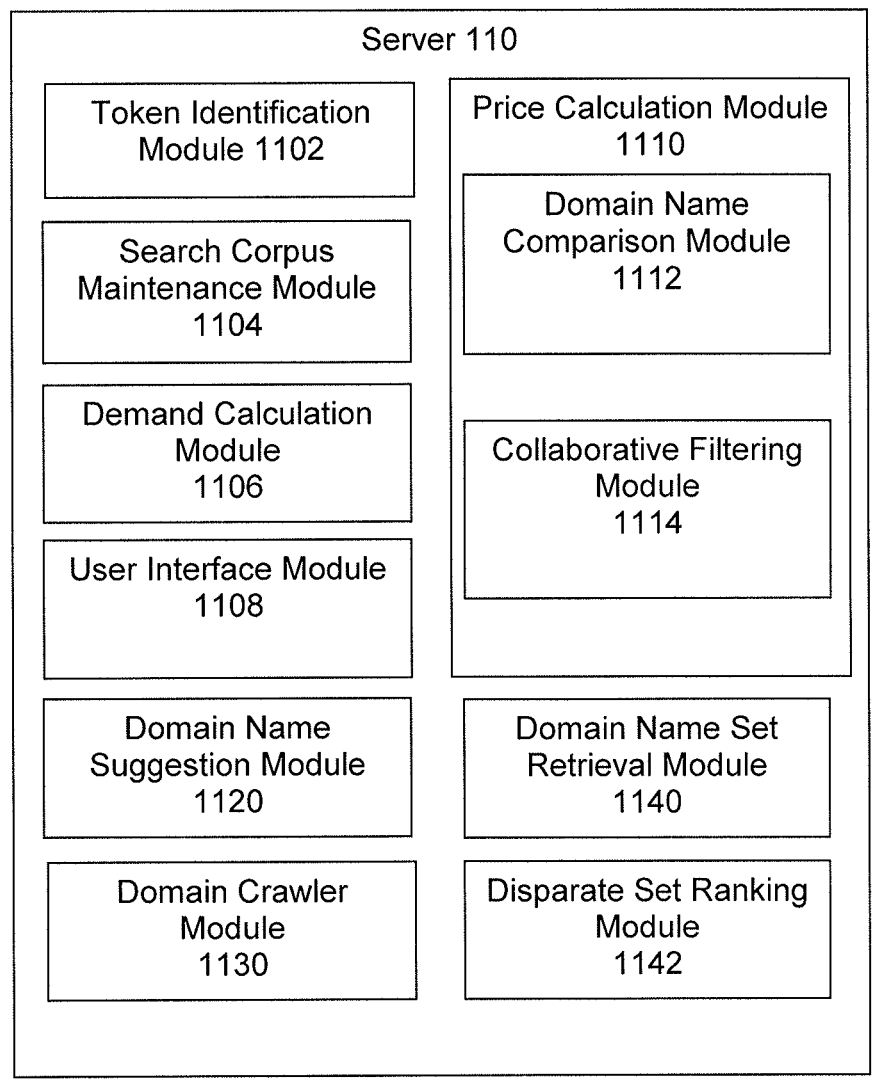
FIG. 11 is a diagram of a server for performing the methods of calculating demand and price for a domain name, for generating a domain inventory, and for ranking candidate domain names across disparate sets, in accordance with the present disclosure.

FIG. 11 illustrates an example environment in which and or all of the demand calculation, price calculation, domain inventory generation, and disparate set ranking methods may be performed. A server (e.g. server 110 of FIGS. 1 and 11) may be configured to perform any of the actions described herein by one or more of a plurality of modules installed on the server 110. It will be understood that the modules may be installed on multiple servers and may configure the servers to perform the tasks or actions cooperatively. Modules may also be mirrored, or subdivided and have their subdivisions installed on different servers, allowing the tasks enabled by the module to be performed cooperatively by the different servers.

A token identification module 1102 identifies tokens from an input, which may be a domain name, string, or set of keywords or search terms as described above. A search corpus maintenance module 1104 may perform analysis of search logs and maintain, in a format usable by the other modules of the server 110, one or more corpuses of previous domain name searches, domain name search terms, and/or registered domain names and associated sales history data, in any suitable intervals as needed. In some embodiments, the search corpus maintenance module 1104 may access other data stores or execute additional program instructions that enable the server 110 to maintain a corpus that is pertinent to characteristics of the searching entity. For example, the corpus may be populated with domain name searches, search terms, domain names, etc., that are selected for their relevance to a geographical region of the entity (e.g., a home state, region, or country). Additionally or alternatively, the corpus may pertain to a certain language, or to one or more industries or commercial sectors relevant to the entity. A demand calculation module 1106 may use the tokens and search corpuses to perform the demand calculation methods described herein. A user interface module 1108 may generate and present user interfaces for transmitting information to user devices and receiving input therefrom.

A price calculation module 1110 may perform the appraisal and pricing methods herein. A domain name comparison module 1112 may identify similar domain names to an input target domain name or set of keywords. A collaborative filtering module 1114 may use the sales history data of similar domain names and demands of tokens and domain names to compile a suitable price for the target domain name using any of the methods described herein.

A domain name suggestion module 1120 may generate candidate domain names in real time during domain searches or during the domain inventory generation. The domain name suggestion module 1120 may take, as input, the domain search terms or any domain names that are nodes of the domain graph and may use any suitable algorithm for generating the candidate domain names therefrom. Suitable algorithms include, without limitation, domain spinning algorithms and traversal of the domain graph as described above. A domain crawler module 1130 implements the domain crawler for identifying and adding domain names to the domain inventory. The domain crawler module 1130 may use the domain name suggestion module 1120 to generate one or more of the domain names the domain crawler uses as input. The domain crawler module 1130 may additionally store information, such as metadata, describing characteristics of one or more of the domain names. For example, metadata that identifies the language, geographical regions, and/or industrial/commercial sectors that are relevant to the domain name may be stored with the domain name, to be used subsequently for classification and ranking purposes as described herein.

A domain name set retrieval module 1140 may create and populate the disparate sets of candidate domain names for ranking as described above. The module 1140 may use the domain name suggestion module 1120 to generate candidate domain names for its real-time sets, and may perform search-and-retrieval of other domain name sources. A disparate set ranking module 1142 may rank candidate domain names from a plurality of disparate sets generated by the domain name set retrieval module 1140 as described above. The disparate set ranking module 1142 may use, as metadata for the candidate domain names it is ranking, data generated by the demand calculation module 1106 (i.e., domain demand data), the domain crawler module 1130 (e.g., generation probabilities) and/or the price calculation module 1110 (e.g., domain prices).

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

What is claimed is:

1. A method, comprising the steps of:
   receiving, by a server communicatively coupled to a network from a computing device in electronic communication with the server via the network, as input in a domain name search query, one or more search tokens that form a second level domain of a target domain name;
   receiving, by the server, a first plurality of candidate domain names each identified as relevant to one or more of the one or more search tokens, and each comprising one or more tokens of a plurality of tokens;
   receiving, by the server, a second plurality of candidate domain names each identified as relevant to one or more of the one or more search tokens and each comprising one or more of the plurality of tokens, the second plurality of candidate domain names being disparate from the first plurality of candidate domain names, wherein a ranking function is unusable to rank one or both of the first plurality of candidate domain names and the second plurality of candidate domain names;
   normalizing, by the server, the first plurality of candidate domain names and the second plurality of candidate domain names to generate a plurality of normalized candidate domain names that can be ranked against each other using the ranking function, the normalizing comprising:
      generating a token index comprising the plurality of tokens;
      calculating the term frequency-inverse document frequency (TF-IDF) of each token in the token index using each of the candidate domain names in the first and second pluralities of candidate domain names as a document, each token of the plurality of tokens appearing in at least one of the candidate domain names, and all of the candidate domain names being formed from one or more of the plurality of tokens; and
      for each candidate domain name, using the TF-IDF of each of the tokens in the candidate domain name to calculate a normalized score for the candidate domain name;
   applying, by the server, the ranking function to the plurality of normalized candidate domain names to create a ranked list of domain names having an order based, at least in part, on the corresponding normalized score of each of the candidate domain names; and
   sending the ranked list of domain names to the computing device.

2. The method of claim 1, wherein receiving the one or more search tokens comprises identifying the one or more search tokens from a character string comprising the second level domain.

3. The method of claim 1, wherein receiving a first candidate domain name of the first plurality of candidate domain names comprises:
   for each of the search tokens, comparing the search token to each of a plurality of previously registered domain names in one or more indexes; and
   responsive to an indication that one of the previously registered domain names contains one of the search tokens, storing the one of the previously registered domain names as the first candidate domain name.

4. The method of claim 1, wherein normalizing the first plurality of candidate domain names and the second plurality of candidate domain names further comprises:
   determining a domain demand for each of the candidate domain names; and
   modifying the normalized score of each of the candidate domain names with the domain demand for the candidate domain name.

5. The method of claim 1, wherein receiving the first plurality of candidate domain names comprises generating the first plurality of candidate domain names in real-time in response to the domain name search query.

6. The method of claim 5, wherein receiving the second plurality of candidate domain names comprises obtaining the second plurality of candidate domain names from an index of pre-existing domain names.

7. A method, comprising:
receiving, by a server communicatively coupled to a network, a plurality of domain name sets generated by a plurality of disparate domain name sources, each domain name set containing a corresponding plurality of domain names;
identifying, by the server, one or more tokens in a second level domain of each of the domain names;
computing, by the server using the one or more tokens, a normalized score for each of the domain names, the computing comprising:
calculating the term frequency-inverse document frequency (TF-IDF) of each token of the one or more tokens using each of the domain names in the plurality of domain name sets as a document; and
using the TF-IDF of each of the tokens in the domain name to calculate the normalized score for the domain name;
generating, by the server from the normalized score for each of the domain names, a ranked list of the plurality of domain names in order of relevance to at least a first token of the one or more tokens; and
causing the ranked list to be selectably displayed on a computing device in electronic communication with the server via the network.

8. The method of claim 7, wherein a ranking function is unusable to rank one or both of a first domain name set and a second domain name set both selected from the plurality of domain name sets, and wherein generating the ranked list comprises applying the ranking function to the first domain name set and the second domain name set using the normalized scores.

9. The method of claim 7, further comprising receiving, by the server from the computing device in electronic communication with the server via the network, a domain name search query comprising one or more search terms that form a second level domain of a target domain name, each domain name in each of the plurality of domain name sets including one or more of the one or more search terms.

10. The method of claim 9, wherein receiving the plurality of domain name sets comprises:
sending the one or more search terms to a first domain name source of the plurality of disparate domain name sources, the first domain name source generating a plurality of candidate domain names from the one or more search terms in real-time; and
receiving a first domain name set of the plurality of domain name sets from the first domain name source, the corresponding plurality of domain names in the first domain name set comprising the plurality of candidate domain names.

11. The method of claim 7, wherein receiving the plurality of domain name sets comprises obtaining a first domain name set of the plurality of domain name sets from a first domain name source of the plurality of disparate domain name sources, the first domain name source comprising an index of pre-existing domain names.

12. A system, comprising:
a server communicatively coupled to a network and configured to receive a first plurality of domain names and a second plurality of domain names disparate from the first plurality of candidate domain names, wherein a ranking function is unusable to rank together the first plurality of domain names and the second plurality of domain names; and
a disparate set ranking module installed on the server, one or more processors of the server executing the disparate set ranking module to:
identify a plurality of tokens from a plurality of second level domains of the first and second pluralities of domain names;
calculate the term frequency-inverse document frequency (TF-IDF) of each token of the plurality of tokens using each domain name in a plurality of domain name sets as a document, the plurality of domain name sets including the first plurality of domain names and the second plurality of domain names;
compute, for each of the domain names in the first and second pluralities of domain names, using the TF-IDF of each of the plurality of tokens that appears in the domain name, a corresponding normalized score for the domain name;
generate a set of normalized domain names that can be ranked using the ranking function, the set comprising one or more of the domain names in the first plurality of domain names and one or more of the domain names in the second plurality of domain names and the corresponding normalized scores for the domain names in the set;
apply the ranking function to the set to generate a ranked list of domain names having an order based at least in part on the corresponding normalized scores of the domain names in the set; and
cause the ranked list to be selectably displayed on a computing device in electronic communication with the server via the network.

13. The system of claim 12, wherein the server is further configured to receive, from the computing device, a domain name search query comprising one or more search terms that form a second level domain of a target domain name, each domain name of each of the first plurality of domain names and the second plurality of domain names including one or more of the one or more search terms.

14. The system of claim 13, further comprising a domain name suggestion module installed on the server, the one or more processors executing the domain name suggestion module to generate the first plurality of domain names from the one or more search terms in real-time.

15. The system of claim 12, wherein to receive the first plurality of domain names, the server is configured to obtain the first plurality of domain names from a first domain name source comprising an index of pre-existing domain names.

* * * * *